(12) United States Patent
Kim et al.

(10) Patent No.: US 11,763,317 B2
(45) Date of Patent: Sep. 19, 2023

(54) METHOD OF MESSAGING SERVICE

(71) Applicant: KAKAO CORP., Jeju-si (KR)

(72) Inventors: Ki Pung Kim, Yongin-si (KR); Young Kil Ko, Seoul (KR); Eun Sun Gil, Seongnam-si (KR); Jun Seo Lee, Seongnam-si (KR); Ji Hoon Moon, Gunpo-si (KR); Have Kyung Jang, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 16/593,904

(22) Filed: Oct. 4, 2019

(65) Prior Publication Data

US 2020/0034851 A1  Jan. 30, 2020

Related U.S. Application Data

(63) Continuation of application No. 15/114,065, filed as application No. PCT/KR2015/000715 on Jan. 23, 2015, now abandoned.

(30) Foreign Application Priority Data

Jan. 24, 2014 (KR) .................. 10-2014-0009021
Feb. 5, 2014 (KR) .................. 10-2014-0013264

(51) Int. Cl.
   *G06Q 30/016*   (2023.01)
   *G06Q 30/0601*   (2023.01)
   (Continued)

(52) U.S. Cl.
   CPC ......... *G06Q 30/016* (2013.01); *G06Q 10/107* (2013.01); *G06Q 30/0631* (2013.01); *H04L 51/04* (2013.01)

(58) Field of Classification Search
   CPC ............ G06Q 30/016; G06Q 30/0631; G06Q 10/107; G06Q 30/02; G06Q 10/10;
   (Continued)

(56) References Cited

U.S. PATENT DOCUMENTS 7,243,078 B1   7/2007  Lewis-Hawkins
7,746,362 B2 *  6/2010  Busey ................. H04M 3/5191
                                                    345/650
(Continued)

FOREIGN PATENT DOCUMENTS

CN   102947848 A   2/2013
JP   10-40317 A    2/1998
(Continued)

OTHER PUBLICATIONS https://whatis.techtarget.com/definition/chat-room (Year: 2020).*
(Continued)

*Primary Examiner* — Maria C Santos-Diaz
(74) *Attorney, Agent, or Firm* — Knobbe Martens Olson & Bear LLP

(57) ABSTRACT

Disclosed is a method of messaging service. The method includes receiving, by at least one server, a chat request for creating a chatroom directed to a transaction that a user has entered into with a first entity. The method further includes creating, by the at least one server in response to receipt of the chat request, a first chatroom that is directed to the transaction and is accessible by the first entity and the user on a messaging application installed in a computing terminal such that the first entity sends one or more messages containing information about the transaction to the user via the first chatroom.

18 Claims, 16 Drawing Sheets

(51) Int. Cl.
*H04L 51/04* (2022.01)
*G06Q 10/107* (2023.01)

(58) Field of Classification Search
CPC .... G06Q 50/01; G06Q 30/06; G06Q 30/0601; H04L 51/04
See application file for complete search history.

(56) References Cited

U.S. PATENT DOCUMENTS

| | | | | |
|---|---|---|---|---|
| 7,761,321 | B2* | 7/2010 | Kannan | G06Q 30/0613 705/7.13 |
| 7,787,609 | B1* | 8/2010 | Flockhart | H04M 3/5233 379/265.01 |
| 7,792,889 | B1* | 9/2010 | Lee | G06Q 30/02 707/948 |
| 9,697,524 | B1* | 7/2017 | Fischer | G06Q 40/02 |
| 10,217,111 | B2* | 2/2019 | Francis | G06Q 50/30 |
| 2002/0029350 | A1 | 3/2002 | Cooper et al. | |
| 2003/0023686 | A1* | 1/2003 | Beams | G09B 5/14 709/205 |
| 2003/0177017 | A1* | 9/2003 | Boyer | G06Q 30/0281 705/304 |
| 2003/0187672 | A1* | 10/2003 | Gibson | G06Q 30/02 709/206 |
| 2006/0080130 | A1* | 4/2006 | Choksi | G06Q 30/016 709/206 |
| 2010/0100490 | A1* | 4/2010 | Lewis-Hawkins | G06Q 30/02 705/304 |
| 2010/0205540 | A1* | 8/2010 | Gupta | H04N 7/157 715/753 |
| 2012/0135718 | A1* | 5/2012 | Amidon | H04L 67/24 455/414.1 |
| 2012/0265697 | A1* | 10/2012 | Tuchman | G06Q 30/016 705/304 |
| 2013/0059578 | A1* | 3/2013 | Finberg | H04L 12/6418 455/425 |
| 2013/0262168 | A1* | 10/2013 | Makanawala | H04L 51/32 705/7.14 |
| 2013/0297700 | A1* | 11/2013 | Hayton | G06Q 10/10 709/204 |
| 2014/0119531 | A1* | 5/2014 | Tuchman | H04M 3/5166 379/265.09 |
| 2014/0171034 | A1* | 6/2014 | Aleksin | H04W 8/183 455/414.1 |
| 2014/0173003 | A1* | 6/2014 | Van | G06Q 10/10 709/206 |
| 2014/0237057 | A1* | 8/2014 | Khodorenko | H04L 51/32 709/206 |
| 2015/0161615 | A1* | 6/2015 | Balasubramanian | H04L 12/1822 705/7.14 |
| 2015/0178371 | A1* | 6/2015 | Seth | G06Q 30/016 707/755 |
| 2015/0256570 | A1* | 9/2015 | Joon | H04L 65/1069 370/261 |
| 2017/0046021 | A1* | 2/2017 | Karidi | G06F 3/0481 |

FOREIGN PATENT DOCUMENTS

| | | |
|---|---|---|
| JP | 2002-215975 A | 8/2002 |
| JP | 2004-248145 A | 9/2004 |
| JP | 2013-84142 A | 5/2013 |
| KR | 10-1094898 B1 | 12/2011 |
| KR | 10-2013-0005617 A | 1/2013 |

OTHER PUBLICATIONS https://www.merriam-webster.com/dictionary/chat%20room (Year: 2020).*
Robison, C. D. (2012). Secure browser-based instant messaging (Order No. 28112430). Available from ProQuest Dissertations and Theses Professional. (2549282435). (Year: 2012).*
Chat Live with other shareholders about: (OTCBB: DLAV), (OTCBB: IHME), (OTCBB: BSGC), (pink sheets: RVGD), (OTCBB: USSU). (Jan. 17, 2008). (Year: 2008).*
Avidar, R. (2010) Online responsiveness and interactivity in organizational public relations (Order No. 28746999). (Year: 2010).*
Office Action of corresponding Japanese Patent Application No. 2016-548108—4 pages (dated Aug. 22, 2017).
"Pine Resort Kakaotalk Plus Friend", Naverblog—Highly Positive, downloaded from http://blognaver.com/kangtais/120206200980—17 pages (Jan. 23, 2014).
"KAKAOTALK3 Version", Naverblog—Korean Langage, downloaded from <http://dnfi2512.blog.me/20190105631>—14 pages (Jun. 21, 2013).
Kakaotalk Plus Friend, Naverblog—Gome, downloaded from <http://sanghee501.blog.me/100151527065>—9 pages (Feb. 20, 2012).
International Search Report of Patent Application No. PCT/KR2015/000715 and its English Translation—4 pages (dated Apr. 9, 2015).

* cited by examiner

METHOD OF MESSAGING SERVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

Embodiments relate to a message intermediation method, a message processing method, a service management method, and a device for implementing the same, and more particularly, to a user terminal that receives a message related to a product or service from a service providing device via a chatroom created by a message intermediation server based on the product or service.

Embodiments relate to a service management method and a service processing terminal for implementing the same, and more particularly, to a service management method for a user terminal requesting a service.

BACKGROUND ART

In related arts, when a user purchases a product, a product seller provides the user with product purchase history such as product preparation or product purchase details through a short message service (SMS), a mobile phone, or a personal computer (PC). Further, in relation to product delivery following the product purchase, a delivery company may inform the user of a product delivery status through an SMS, or the user may directly check the delivery status through a PC or a mobile phone.

Thus, the user may need to communicate with a service provider using a somewhat complex method after purchasing a product. In addition, the service provider may need to bear communication expense for use of SMS to provide the user with further details.

Accordingly, a method of providing information to or communicating with a user more conveniently in relation to a product or services provided to the user is needed.

Meanwhile, in general, service providers that provide various types of services such as a delivery person, a taxi driver, a deputy driver, and a deputy service may carry client terminals such as smartphones, tablet PCs, or personal digital assistants (PDAs) for service management. The service providers may process services requested by users more conveniently using such client terminals.

However, when a service provider provides a user with a service schedule notification or a service progress necessary when processing a service, the service provider spends separate communication expense to transmit information or messages necessary for processing the service.

Further, service providers of different businesses may use different service management programs, or a separate service management program may not be installed in a client terminal of a service provider. Accordingly, a method of managing a service requested by a user conveniently using a client terminal of a service provider is needed.

SUMMARY

An aspect provides a method and device that may intermediate a message related to a product or service via a chatroom created based on the product or service, thereby forwarding the message related to the product or service to a user terminal more conveniently.

Another aspect provides a method and device that may allow a service processing device to forward a message related to a product or service to a user terminal without charge via a chatroom provided by a messenger program, without incurring a separate cost.

Still another aspect provides a method and device that may improve a service efficiency by inducing a user to perform an action requested by a service provider through a message related to a product or service.

Yet another aspect provides a method and terminal that may allow a service provider possessing a service processing terminal to process service management for a user terminal requesting a service more conveniently.

Further another aspect provides a method and terminal that may manage a service relatively simply and cost-efficiently by forwarding various types of service progress messages necessary for processing the service after a chatroom provided by a chat program is created based on the service requested by a user.

According to an aspect, there is provided a message intermediation method performed by a message intermediation server, the message intermediation method including receiving a chat request related to a product or service from a user terminal or at least one service providing device, identifying the product or service, creating a chatroom corresponding to the identified product or service, and forwarding, to the user terminal, a message received from the at least one service providing device via the chatroom.

The creating may include creating a separate chatroom for each of a plurality of products or services in a case in which the plurality of products or services are unassociated with each other.

The creating may include creating the chatroom to exchange messages related to a plurality of products or services in a case in which the plurality of products or services are associated with each other.

The receiving may include receiving the chat request including identification information related to the product or service and a user identification (ID).

The message intermediation server may be configured to generate a token with respect to the chatroom based on identification information related to the product or service and a user ID received from the user terminal or the at least one service providing device, and transfer the generated token to the user terminal or the at least one service providing device.

The user terminal or the at least one service providing device may be configured to access the chatroom using the token received from the message intermediation server.

The service providing device may be configured to transmit a message related to a service progress to the user terminal, and control the service progress based on a response of the user terminal with respect to the message related to the service progress.

The service providing device may include a service management server configured to provide the product or process the service, or a service processing terminal configured to interoperate with the service management server to provide the product or process the service.

The message may be connected to an interface to request a response of the user terminal with respect to the message.

According to another aspect, there is also provided a message processing method performed by a user terminal processing a message intermediated through a message intermediation server, the message processing method including accessing a chatroom created in response to a chat request related to a product or service from the user terminal or at least one service providing device, receiving a message forwarded from the at least one service providing device via the chatroom, and displaying the received message, wherein the chatroom may be created to correspond to the product or service identified by a message intermediation server.

The chatroom may be created based on an association between a plurality of products or services in a case in which the plurality of products or services are associated with each other.

The chatroom may be created in response to the chat request including identification information related to the product or service and a user ID.

The message intermediation server may be configured to generate a token with respect to the chatroom based on identification information related to the product or service and a user ID received from the user terminal or the at least one service providing device, and transfer the generated token to the user terminal or the at least one service providing device.

The accessing may include accessing the chatroom using the token received from the message intermediation server.

The service providing device may be configured to forward a message related to a service progress to the user terminal, and control the service progress based on a response of the user terminal with respect to the message related to the service progress.

The service providing device may include a service management server configured to provide the product or process the service, or a service processing terminal configured to interoperate with the service management server to provide the product or process the service.

The displaying may include displaying the message connected to an interface to request a response of the user terminal with respect to the message.

According to still another aspect, there is also provided a message processing method performed by a service providing device processing a message intermediated through a message intermediation server, the message processing method including accessing a chatroom created in response to a chat request related to a product or service from a user terminal or at least one service providing device, and transmitting a message related to the product or service to the user terminal via the chatroom, wherein the chatroom may be created to correspond to the product or service identified by a message intermediation server.

The chatroom may be created based on an association between a plurality of products or services in a case in which the plurality of products or services are associated with each other.

The chatroom may be created in response to the chat request including identification information related to the product or service and a user ID.

The message intermediation server may be configured to generate a token with respect to the chatroom based on identification information related to the product or service and a user ID received from the user terminal or the at least one service providing device, and transfer the generated token to the user terminal or the at least one service providing device.

The accessing may include accessing the chatroom using the token received from the message intermediation server.

The message processing method may further include forwarding a message related to a service progress to the user terminal, and controlling the service progress based on a response of the user terminal with respect to the message related to the service progress.

The at least one service providing device may include a service management server configured to provide the product or process the service, or a service processing terminal configured to interoperate with the service management server to provide the product or process the service.

According to yet another aspect, there is also provided a message intermediation server to intermediate a message, the message intermediation server including a chat request receiver configured to receive a chat request related to a product or service from a user terminal or at least one service providing device, a product/service identifier configured to identify the product or service, a chatroom creator configured to create a chatroom corresponding to the identified product or service, and a message forwarder configured to forward, to the user terminal, a message received from the at least one service providing device via the chatroom.

The chatroom creator may be configured to create a separate chatroom for each of a plurality of products or services in a case in which the plurality of products or services are unassociated with each other, and to create the chatroom to exchange messages related to a plurality of products or services in a case in which the plurality of products or services are associated with each other.

According to further another aspect, there is also provided a user terminal including a chatroom accessor configured to access a chatroom created in response to a chat request related to a product or service from the user terminal or at least one service providing device, a message receiver configured to receive a message forwarded from the at least one service providing device via the chatroom, and a message display configured to display the received message, wherein the chatroom may be created to correspond to the product or service identified by a message intermediation server.

According to still another aspect, there is also provided a service providing device including a chatroom accessor configured to access a chatroom created in response to a chat request related to a product or service from a user terminal or at least one service providing device, and a message transmitter configured to transmit a message related to the product or service to the user terminal via the chatroom, wherein the chatroom may be created to correspond to the product or service identified by a message intermediation server.

According to yet another aspect, there is also provided a service management method performed by a service processing terminal, the service management method including receiving a service list including at least one service requested by a user, and transmitting a service progress message via a chatroom created based on the service requested by the user, wherein the service list may include details of the user requesting the service or details of the service.

The chatroom may be created one time based on the service requested by the user.

The chatroom may disappear when a service processing period preset for the selected service elapses or the service is processed.

The service management method may further include inquiring at least one user terminal included in the service list about whether to consent to processing of the service requested by the user.

In a case in which a consent of the user is received from the user terminal with respect to the inquiry, the chatroom may be created by a message intermediation server based on the service requested by the user.

The chatroom may be created based on details of the service requested by the user and details of the user.

The service management method may further include changing a service status based on a response of the user with respect to the service progress message.

The service management method may further include receiving details of a service requested by at least one user included in the service list, and inquiring a service provider possessing a service processing terminal about whether to process the service requested by the user based on the received details.

The transmitting may include transmitting the service progress message to a user terminal of another user who is registered as a friend of the user or a user terminal of another user designated by the user.

The receiving may include arranging the service list based on at least one of a service processing schedule associated with the user terminal requesting the service, a service processing region, or a service status.

According to still another aspect, there is also provided a service processing terminal including a list receiver configured to receive a service list including at least one service requested by a user, and a message transmitter configured to transmit a service progress message via a chatroom created based on the service requested by the user, wherein the service list may include details of the user requesting the service or details of the service.

The service processing terminal may further include a consent inquirer configured to inquire at least one user terminal included in the service list about whether to consent to processing of the service requested by the user.

In a case in which a consent of the user is received from the user terminal with respect to the inquiry, the chatroom may be created by a message intermediation server based on the service requested by the user.

The service processing terminal may further include a service manager configured to change a service status configured to change a service status based on a response of the user with respect to the service progress message.

The service processing terminal may further include a service inquirer configured to receive details of a service requested by at least one user included in the service list, and inquire a service provider possessing a service processing terminal about whether to process the service requested by the user based on the received details.

According to an embodiment, by intermediating a message related to a product or service via a chatroom created based on the product or service, the message related to the product or service may be forwarded to a user terminal more conveniently.

According to an embodiment, a service processing device may forward a message related to a product or service to a user terminal without charge via a chatroom provided by a messenger program, without incurring a separate cost.

According to an embodiment, a service efficiency may improve by inducing a user to perform an action requested by a service provider through a message related to a product or service.

According to an embodiment, a service provider possessing a service processing terminal may process service management for a user terminal requesting a service more conveniently.

According to an embodiment, a service may be managed relatively simply and cost-efficiently by forwarding various types of service progress messages necessary for processing the service after a chatroom provided by a chat program is created based on the service requested by a user.

EMBODIMENTS

Hereinafter, embodiments will be described in detail with reference to the accompanying drawings.

Figure 1:
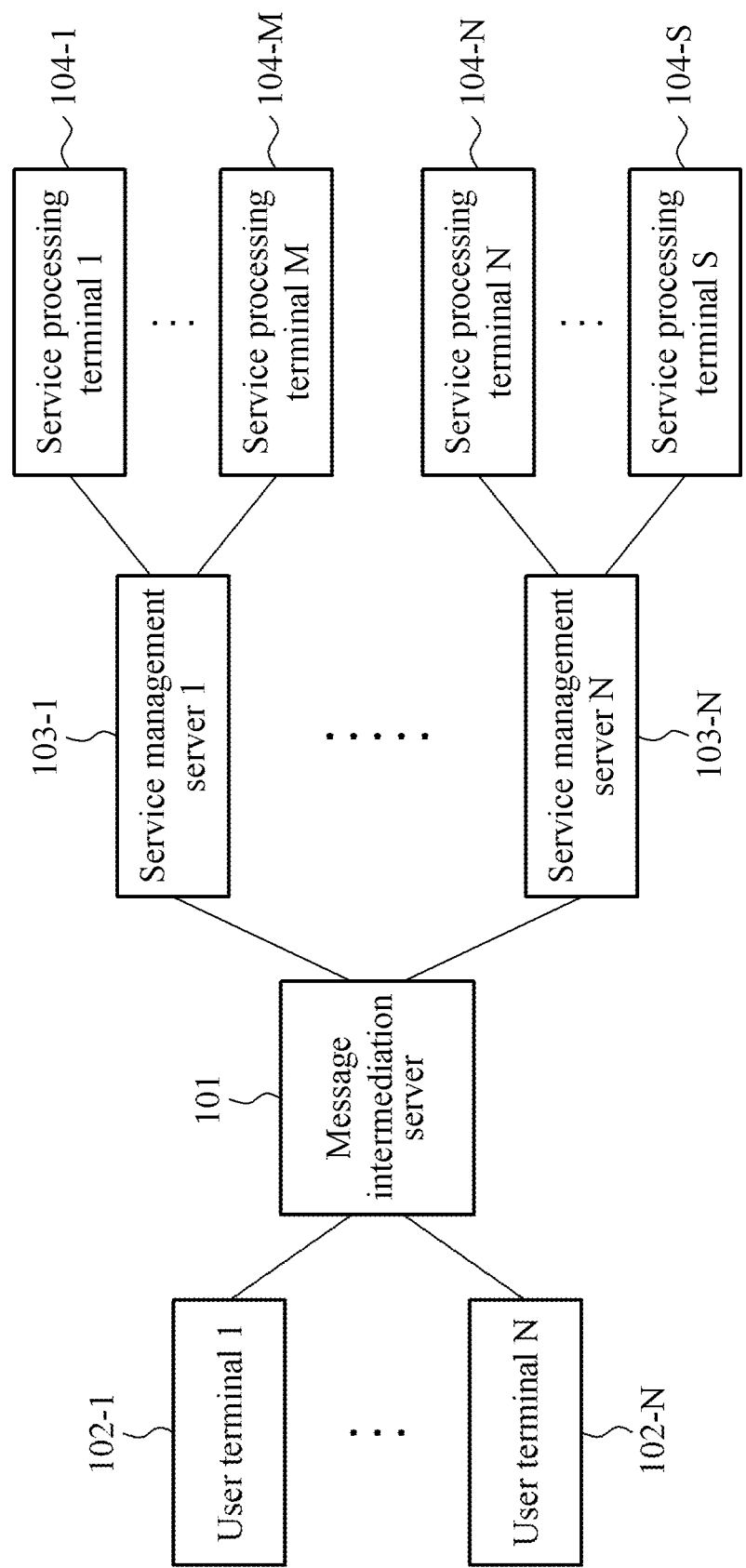
FIG. 1 is a block diagram illustrating an overall system for performing a message intermediation method according to an embodiment.

FIG. 1 is a block diagram illustrating an overall system for performing a message intermediation method according to an embodiment.

The system shown in FIG. 1 may include a message intermediation server 101, user terminals 102-1 through 102-N, service management servers 103-1 through 103-N, and service processing terminals 104-1 through 104-S. The service management servers 103-1 through 103-N and the service processing terminals 104-1 through 104-S may be defined as service providing devices.

The service management servers 103-1 through 103-N may refer to servers operated by providers that provide products or services, for example, product sellers or delivery companies. The service processing terminals 104-1 through 104-S may refer to communication terminals, for example, personal digital assistants (PDAs), smart phones, portable terminals, personal computers (PCs), or tablets, carried by clients that sell or deliver products in reality through interoperation with the service management servers 103-1 through 103-N. Hereinafter, a service providing device may refer to one of the service management servers 103-1 through 103-N and the service processing terminals 104-1 through 104-S.

The message intermediation server 101 may intermediate messages between the user terminals 102-1 through 102-N and the service processing terminals 104-1 through 104-S via chatrooms created to correspond to the services or products. Also, the message intermediation server 101 may intermediate messages between the user terminals 102-1 through 102-N and the service management servers 103-1 through 103-N.

The message intermediation server 101 may provide the chatrooms corresponding to the services or products to the user terminals 102-1 through 102-N and the service providing devices, and thus the service providing devices may forward messages related to the products or services to the user terminals via the chatrooms more conveniently.

For example, a user of the user terminal 102-1 may purchase a product and be going to receive the product through a delivery service. A service providing device that performs a product sales service may provide the user terminal 102-1 with various messages related to product purchase via a chatroom corresponding to the product. A service providing device that performs a product delivery service may provide the user terminal 102-1 with various messages related to product delivery via the chatroom corresponding to the product.

The user terminal 102-1 may receive various messages related to a product or service from a service providing device via a chatroom corresponding to the product or service. Thus, the user terminal and the service providing device may communicate with each other more conveniently. In particular, the chatroom corresponding to the product or service may be created through an application, for example, a messenger program, installed in each of the user terminal and the service providing device. In a case in which messages are transmitted and received through the application without charge, the service providing device may provide the user terminal with messages related to the product or service in a form of text messages, thereby reducing costs.

A message may be connected to an interface to request a response of the user terminal with respect to the message. For example, identifiers, for example, buttons or icons, related to a processing request or a selection of a user with respect to content of the message may be displayed in conjunction with the message in the chatroom.

Figure 2:
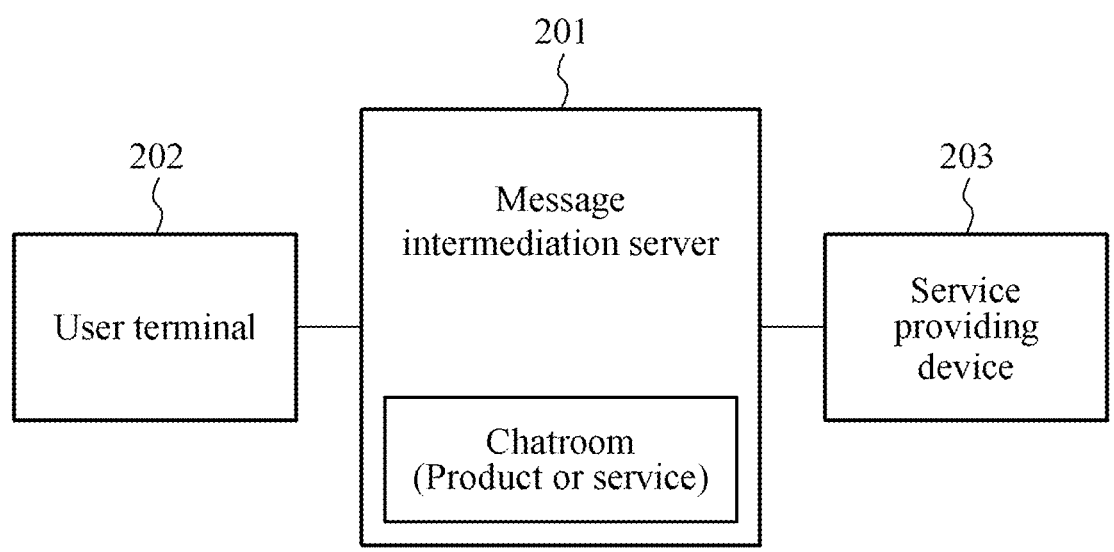
FIG. 2 is a block diagram illustrating a process of intermediating a message via a chatroom according to an embodiment.

FIG. 2 is a block diagram illustrating a process of intermediating a message via a chatroom according to an embodiment.

Referring to FIG. 2, a process in which a service providing device 203 transmits a message related to a product or service to a user terminal 202 via a chatroom provided by a message intermediation server 201 is illustrated. Here, the chatroom may be used in a messenger program commonly used in the user terminal 202 and the service providing device 203. The chatroom may be created to correspond to the product or service. In particular, the messenger program may be installed in each of the user terminal 202 and the service providing device 203 in a form of an application, and may be distributed by the message intermediation server 201. The user terminal 202 and the service providing device 203 may be registered in advance at the message intermediation server 201 through authentication to install the messenger program.

Irrespective of whether the user terminal 202 and the service providing device 203 are added as friends or not, the chatroom corresponding to the product or service may be created. Since the user terminal 202 and the service providing device 203 are not requested to add each other as friends to create a chatroom, the user terminal 202 and the service providing device 203 may communicate with each other more conveniently via the chatroom created by the message intermediation server 201.

A chatroom may be created separately based on a product or service provided by the service providing device 203 to the user terminal 202. For example, in a case in which the service providing device 203 provides a plurality of products or services to the user terminal 202, and the plurality of products or services are unassociated with each other, a different chatroom may be created for each of the plurality of products or services.

Conversely, in a case in which the plurality of products or services are associated with each other, the chatroom may be created to exchange messages related to the plurality of products or services. In an example, the plurality of products or services may be determined to be associated with each other in a case in which:

(i) a service accompanies a product or a product accompanies a service, for example, a free gift for a service or a free service is provided;

(ii) products or services are provided in succession over time;

(iii) products or services are categorized intentionally at a request of a user terminal; or (iv) products or services are assigned the same identification information.

In a case in which product sales and product delivery with respect to a predetermined product are performed in succession over time, the product sales and the product delivery may be determined to be associated with each other. In this example, although a service providing device transmitting a message related to the product sales differs from a service providing device transmitting a message related to the product delivery, the messages may be transmitted to a user terminal via the chatroom.

Figure 3:
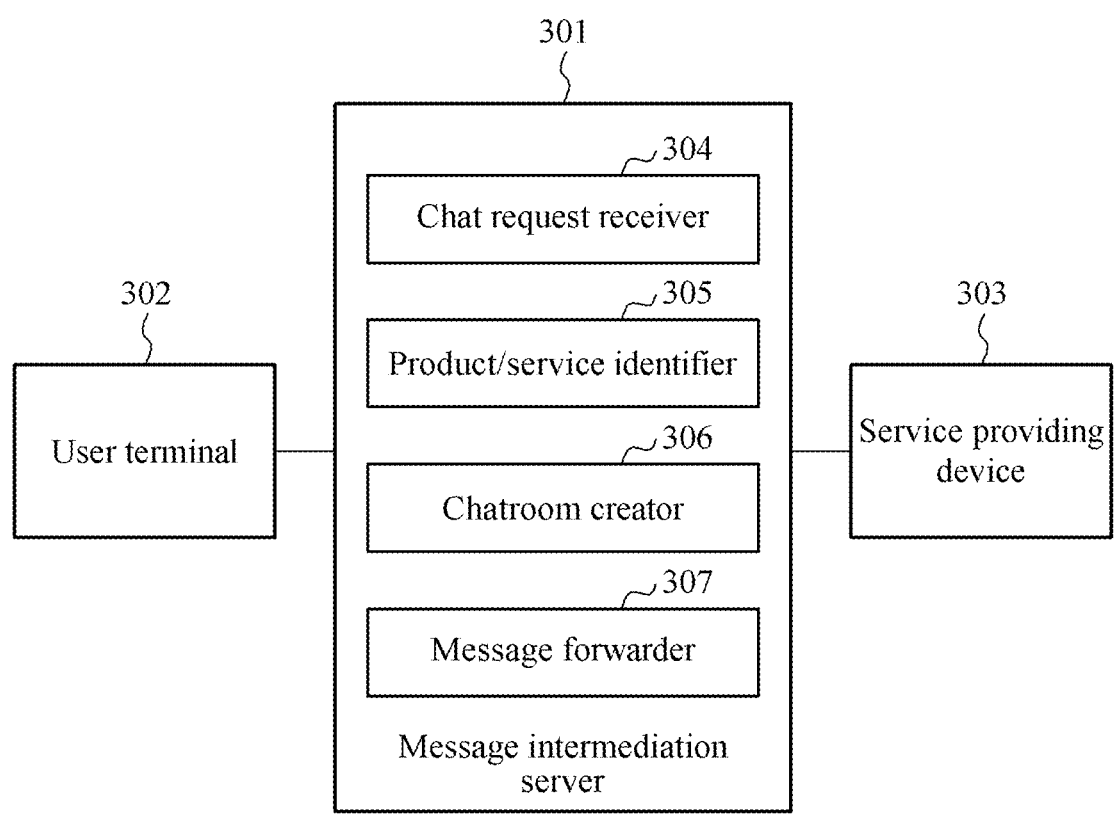
FIG. 3 is a block diagram illustrating a configuration of a message intermediation server according to an embodiment.

FIG. 3 is a block diagram illustrating a configuration of a message intermediation server according to an embodiment.

Referring to FIG. 3, a message intermediation server 301 may include a chat request receiver 304, a product/service identifier 305, a chatroom creator 306, and a message forwarder 307.

The chat request receiver 304 may receive a chat request related to a product or service from a user terminal 302 or at least one service providing device 303. The chat request receiver 304 may receive the chat request including identification information related to the product or service and a user identification (ID) from the user terminal or the at least one service providing device 303.

The product/service identifier 305 may identify the product or service.

The chatroom creator 306 may create a chatroom corresponding to the identified product or service.

In an example, in a case in which a plurality of products or services are unassociated with each other, the chatroom creator 306 may create a separate chatroom for each of the plurality of products or services. In a case in which a plurality of products or services are associated with each other, the chatroom creator 306 may create the chatroom to exchange messages related to the plurality of associated products or services.

The message intermediation server 301 may generate a token with respect to the chatroom based on the identification information related to the product or service and the user ID received from the user terminal 302 or the at least one service providing device 303. The identification information related to the product or service may refer to unique information to identify the product or service. The user ID may refer to unique information to identify a user of the user terminal 302, for example, a name or a phone number.

The message intermediation server 301 may transfer the generated token to the user terminal 302 or the at least one service providing device 303. The user terminal 302 or the at least one service providing device 303 may access the chatroom using the token received from the message intermediation server 301. Here, the token may be a one-time token which is an authority to access the chatroom.

The message forwarder 307 may forward, to the user terminal 302, a message received from the at least one service providing device 303 via the chatroom.

When the product or service is provided, the chatroom creator 306 may delete the chatroom corresponding to the product or service. In detail, the chatroom may be deleted as the token which is the authority to access the chatroom expires. In this example, the chatroom creator 306 may store the messages transmitted via the chatroom for a preset period at a request of the user terminal 302.

Figure 4:
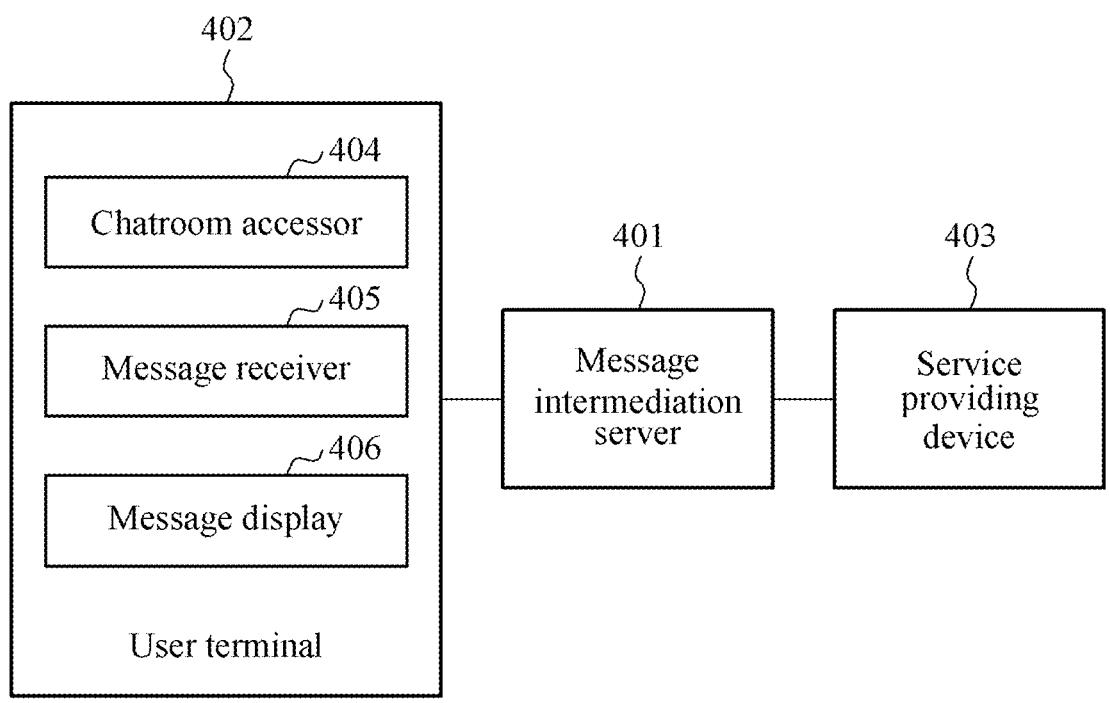
FIG. 4 is a block diagram illustrating a configuration of a user terminal according to an embodiment.

FIG. 4 is a block diagram illustrating a configuration of a user terminal according to an embodiment.

Referring to FIG. 4, a user terminal 402 may include a chatroom accessor 404, a message receiver 405, and a message display 406.

The chatroom accessor 404 may access a chatroom created in response to a chat request related to a product or service from the user terminal or at least one service providing device. In a case in which a plurality of products or services are associated with each other, the chatroom may be created based on an association between the plurality of products or services. In a case in which a plurality of products or services are unassociated with each other, a separate chatroom may be created for each of the plurality of products or services. In this example, the user terminal 402 and a service providing device 403 may access the chatroom using a token generated based on identification information related to the product or service requested by the user terminal 402 and a user ID.

Here, the identification information related to the product or service may refer to unique information to identify the product or service. The user ID may refer to unique information to identify a user of the user terminal 402, for example, a name or a phone number. The user terminal 402 and the service providing device 403 may access the chatroom created to correspond to the product or service using a token provided by a message intermediation server 401.

When the product or service is provided, the chatroom corresponding to the product or service may be deleted. In detail, the chatroom may be deleted as the token which is an authority to access the chatroom expires. In this example, the chatroom creator 306 may store messages transmitted via the chatroom for a preset period at a request of the user terminal 302.

The message receiver 405 may receive a message transmitted from the service providing device 403 via the chatroom. The message transmitted from the service providing device 403 may include a message to inform the user of product provision, product processing, service scheduling, or service preparation in relation to the product or service, or a message to inform the user of a post-processing process of the service. In detail, the message may include content to provide the user terminal 402 with product provision or a processing status of the service for each process of processing the product or service.

The message display 406 may display, on a chat window, the message transmitted by the service providing device 403 via the chatroom.

Figure 5:
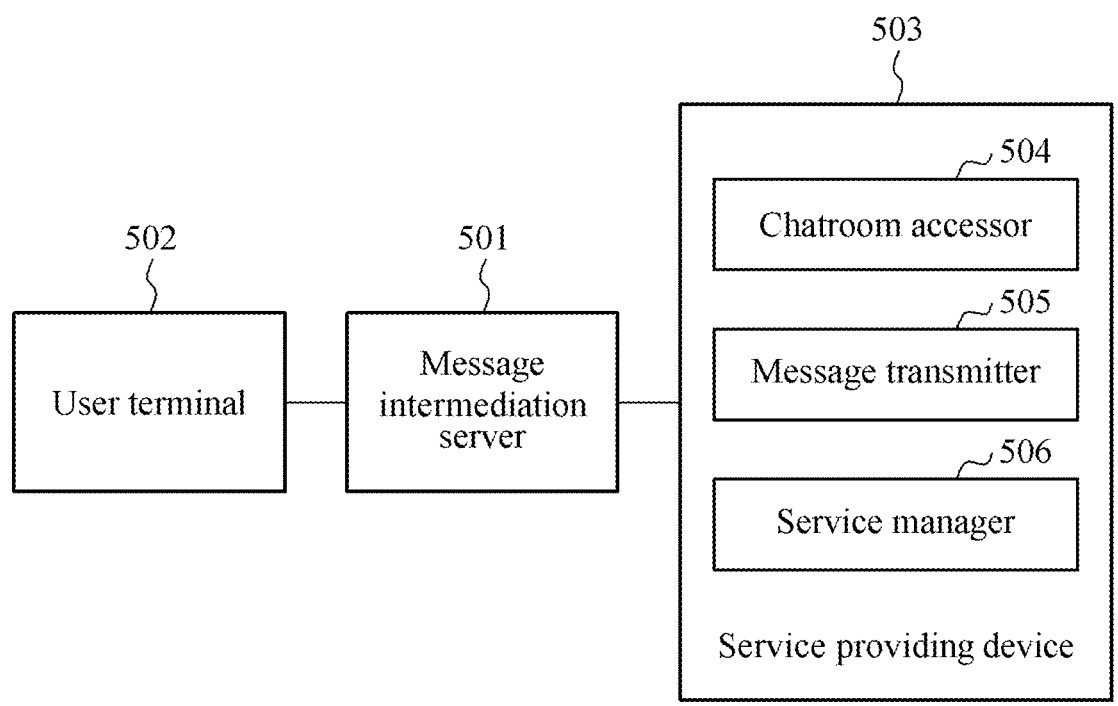
FIG. 5 is a block diagram illustrating a configuration of a service providing device according to an embodiment.

FIG. 5 is a block diagram illustrating a configuration of a service providing device according to an embodiment.

Referring to FIG. 5, a service providing device 503 may include a chatroom accessor 504, a message transmitter 505, and a service manager 506.

The chatroom accessor 504 may access a chatroom created in response to a chat request related to a product or service from a user terminal or at least one service providing device. In a case in which a plurality of products or services are associated with each other, the chatroom may be created based on an association between the plurality of products or services. In a case in which a plurality of products or services are unassociated with each other, a separate chatroom may be created for each of the plurality of products or services. In this example, a user terminal 502 and the service providing device 503 may access the chatroom using a token generated based on identification information related to the product or service requested by the user terminal 502 and a user ID. Here, the token may be a one-time token to be used by the user terminal 502 and the service providing device 503 to access the chatroom.

The identification information related to the product or service may refer to unique information to identify the product or service. The user ID may refer to unique information to identify a user of the user terminal 502, for example, a name or a phone number. The chatroom accessor 504 may access the chatroom created to correspond to the product or service using the token.

When the product or service is provided, the chatroom corresponding to the product or service may be deleted. In detail, the chatroom may be deleted as the token which is an authority to access the chatroom expires. In this example, a message intermediation server 501 may store messages transmitted via the chatroom for a preset period at a request of the user terminal 502.

The message transmitter 505 may transmit a message related to the product or service via the chatroom. The message transmitted from the service providing device 503 may include a message to inform the user of product provision, product processing, service scheduling, or service preparation in relation to the product or service, or a message to inform the user of a post-processing process of the service. In detail, the message may include content to provide the user terminal 502 with product provision or a processing status of the service for each process of processing the product or service.

The service manager 506 may arrange and list user terminal 502 based on at least one of product/service processing schedules, product/service processing regions, or product/service statuses associated with the user terminal 502 requesting the product or service. The service manager 506 may transmit the product/service processing schedules to the user terminal 502 requesting the product or service.

The service manager 506 may control a status of the product or service based on a response of the user terminal 502 with respect to the product/service processing schedules. An operation of the service manager 506 will be described further with reference to FIG. 9.

Figure 6:
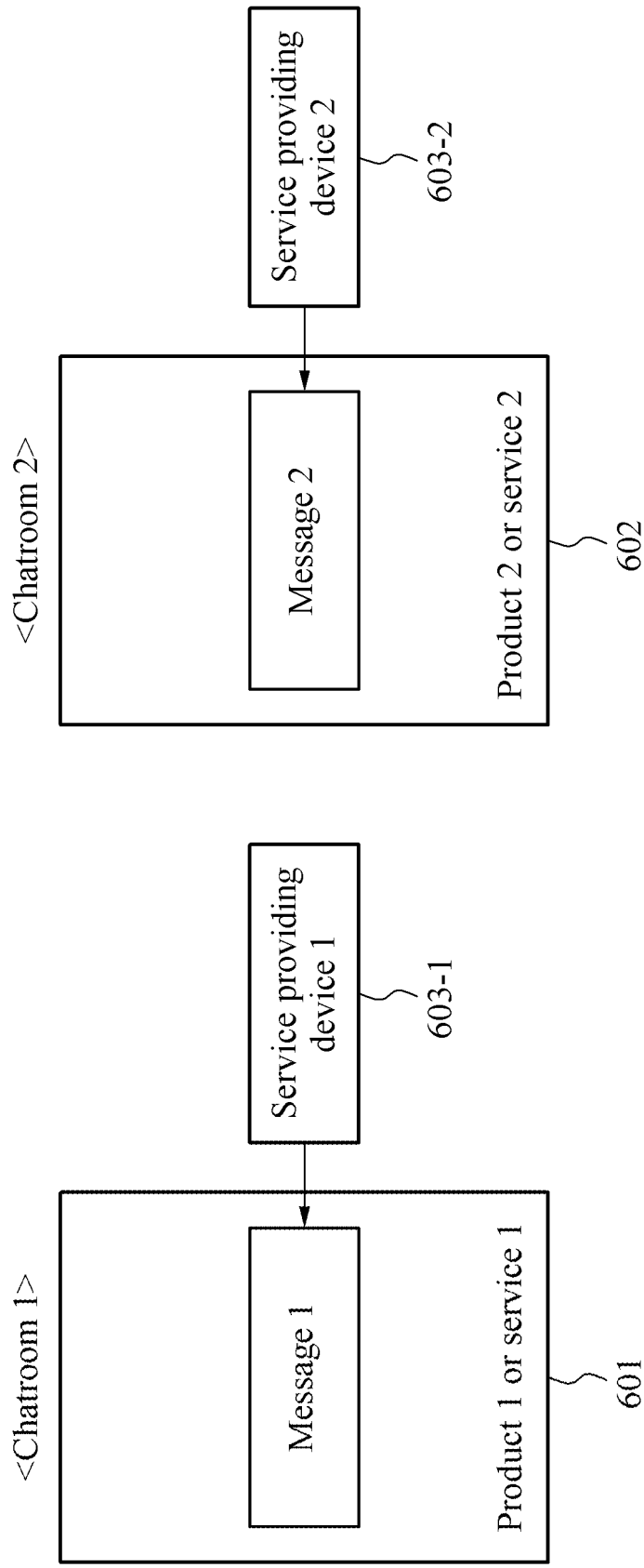
FIG. 6 is a block diagram illustrating a process of transmitting messages via chatrooms created in a case in which a plurality of products or services are unassociated with each other according to an embodiment.

FIG. 6 is a block diagram illustrating a process of transmitting messages via chatrooms created in a case in which a plurality of products or services are unassociated with each other according to an embodiment.

Referring to FIG. 6, a service providing device 1 603-1 may provide a product 1 or service 1, and a service providing device 2 603-2 may provide a product 2 or service 2. In an example, in a case in which a plurality of products or services are provided to a user terminal and the plurality of products or services are unassociated with each other, a separate chatroom may be created for each product or service.

In FIG. 6, in a case in which the product 1 or service 1 is unassociated with the product 2 or service 2, a chatroom 1 601 corresponding to the product 1 or service 1 provided by the service providing device 1 603-1 may be created, and a message 1 related to the product 1 or service 1 may be transmitted to the user terminal via the chatroom 1 601. A chatroom 2 602 corresponding to the product 2 or service 2 provided by the service providing device 2 603-2 and independent of the chatroom 1 601 may be created, and a message 2 related to the product 2 or service 2 may be transmitted to the user terminal via the chatroom 2 602.

In a case in which a plurality of products or services are unassociated with each other, a chatroom corresponding to each of the plurality of products or services may be created. In detail, in a case in which unassociated products or services are provided to the same user terminal, a different chatroom may be created for each product or service.

Figure 7:
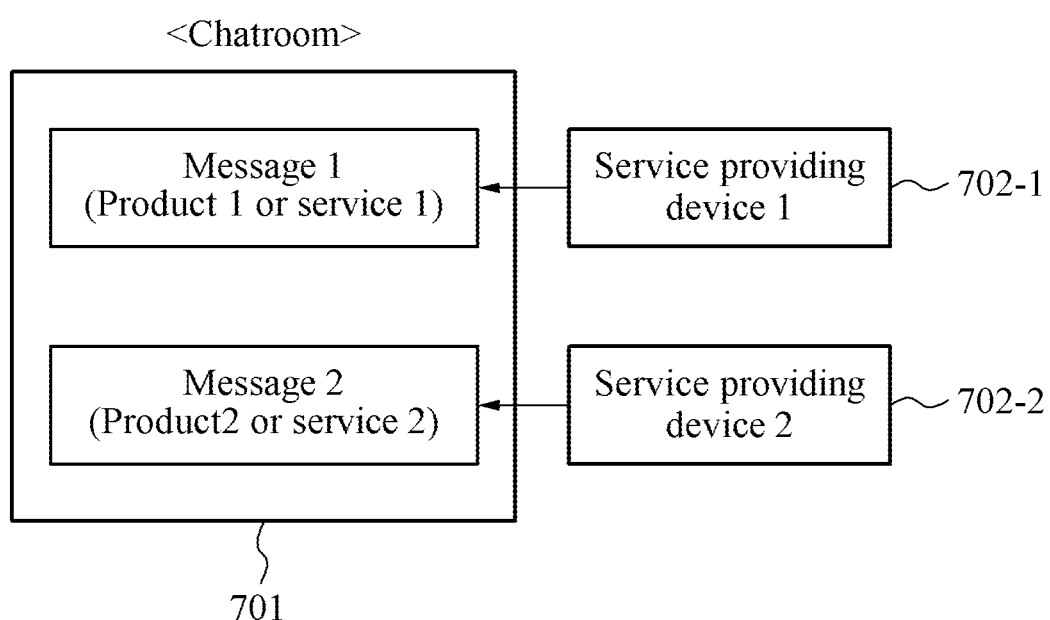
FIG. 7 is a block diagram illustrating a process of transmitting messages via a chatroom created in a case in which a plurality of products or services are associated with each other according to an embodiment.

FIG. 7 is a block diagram illustrating a process of transmitting messages via a chatroom created in a case in which a plurality of products or services are associated with each other according to an embodiment.

Referring to FIG. 7, a service providing device 1 702-1 may provide a product 1 or service 1, and a service providing device 2 702-2 may provide a product 2 or service 2. In an example, in a case in which a plurality of products or services are provided to a user terminal and associated with each other, the chatroom may be created based on an association between the plurality of products or services.

In FIG. 7, the product 1 or service 1 may be associated with the product 2 or service 2. In this example, a message 1 related to the product 1 or service 1 provided by the service providing device 1 702-1, and a message 2 related to the product 2 or service 2 provided by the service providing device 2 702-2 may be transmitted to the user terminal via the chatroom created based on an association between the product 1 or service 1 and the product 2 or service 2.

As described above, products or services may be determined to be associated with each other in a case in which (i) a service accompanies a product or a product accompanies a service, for example, a free gift for a service or a free service is provided, (ii) products or services are provided in succession over time, (iii) products or services are categorized intentionally at a request of a user terminal, or (iv) products or services are assigned the same identification information.

For example, the service providing device 1 702-1 may sell a product to a user, and the service providing device 2 702-2 may deliver the product to the user. Delivering the product to the user is a product delivery service accompanied by selling the product. Thus, a message related to product sales and a message related to product devilry may be transmitted to the user terminal via the chatroom.

Figure 8:
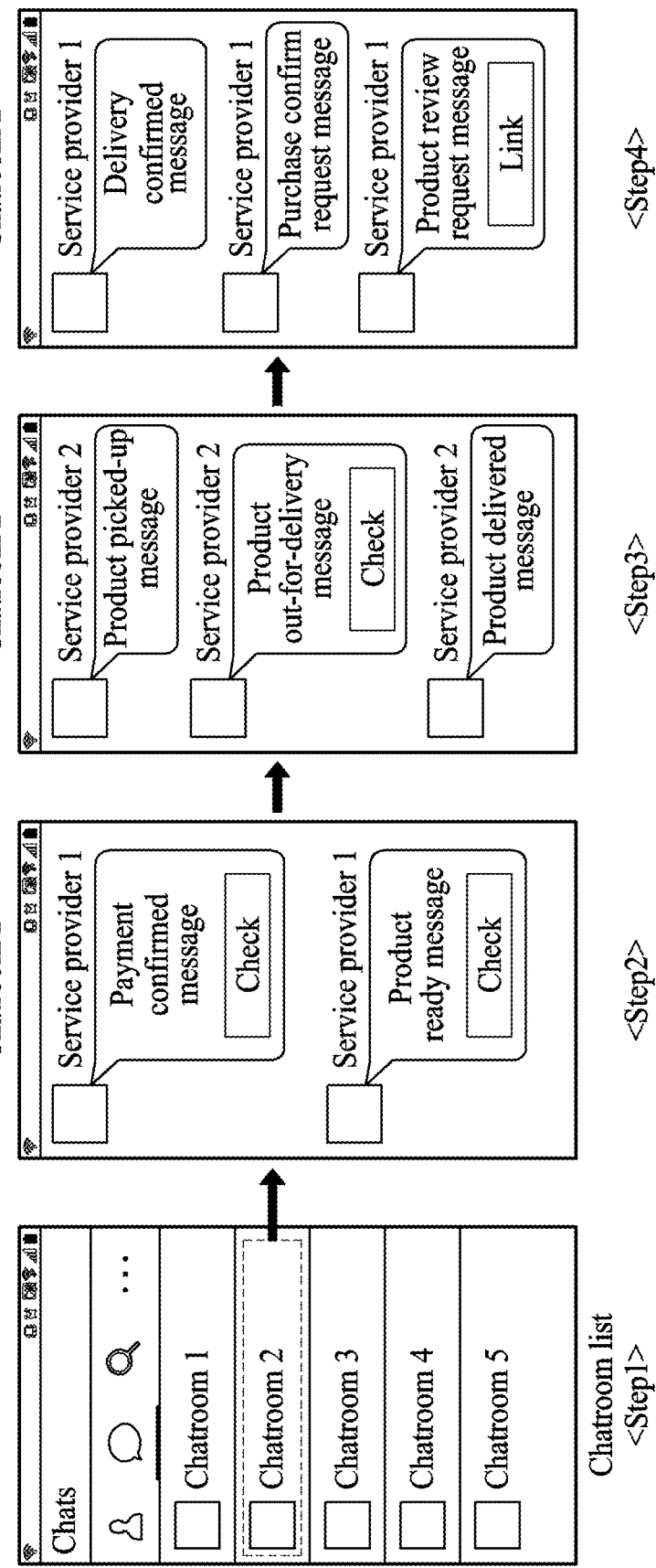
FIG. 8 illustrates messages transmitted from service providing devices via a chatroom in a process of processing a product or service according to an embodiment.

FIG. 8 illustrates messages transmitted from service providing devices via a chatroom in a process of processing a product or service according to an embodiment.

Referring to FIG. 8, a chatroom list shown in step 1 may be displayed through a messenger program installed in a user terminal. The chatroom list may include a chatroom created based on a product or service and a chatroom created between the user terminal and another user terminal added as a friend of the user terminal.

When a chatroom 2 corresponding to a product is created, a message intermediation server may generate a token based on identification information related to the product and a user ID and provide the generated token to a user terminal and a service providing device. When the user terminal or the service providing device selects the chatroom 2, the user terminal or the service providing device may access the chatroom 2 using the token provided by the message intermediation server.

The product may be sold by a service provider 1 and delivered by a service provider 2. A product sales service and a product delivery service may be accompanied by a predetermined product, and thus associated with each other. Although the product sales service and the product delivery service are provided by different service providers, messages may be transmitted to a user terminal via the chatroom through the medium of the product.

Step 2 of FIG. 8 illustrates a case in which messages related to purchasing the product are transmitted. Referring to step 2, the service provider 1 that provides the product sales service may transmit a payment confirmed message with respect to product purchase to the user terminal via the chatroom 2. The service provider 1 that provides the product sales service may transmit a product ready message for product delivery to the user terminal via the chatroom 2.

Step 3 of FIG. 8 illustrates a case in which messages related to delivering the product purchased by the user are transmitted. Referring to step 3, the service provider 2 that provides the product delivery service may transmit a product picked-up message to the user terminal via the chatroom 2. The service provider 2 that provides the product delivery service may transmit a product out-for-delivery message to the user terminal via the chatroom 2. The service provider 2 that provides the product delivery service may transmit a product delivered message to the user terminal via the chatroom 2.

Step 4 of FIG. 8 illustrates a case in which messages related to receiving the product and confirming the product purchase are transmitted. Referring to step 4, the service provider 1 that provides the product sales service may transmit a delivery confirmed message to the user terminal via the chatroom 2. The service provider 1 that provides the product sales service may transmit a purchase confirm request message to the user terminal via the chatroom 2. Further, the service provider 1 that provides the product sales service may transmit a product review request message to the user terminal via the chatroom 2.

When the user writes a product review and the services associated with the product are completed, the chatroom 2 may be deleted from the chatroom list. Further, some of the messages shown in FIG. 8 may each be connected to an interface to request a response of the user terminal. For example, some of the messages shown in FIG. 8 may each be connected to an interface to check content of the message or to move to a predetermined link.

The messages shown in FIG. 8 may include messages related to various services related to the product, for example, product sales, product delivery, and product purchase confirmation. The user terminal 102 may communicate with the service providing device via the chatroom 2. Further, in a case in which messages are transmitted via a chatroom without charge, the service providing device may reduce communication costs while processing a desired service through a messenger program. In addition, a messenger program frequently used by the user terminal may still be utilized, and thus the service providing device may communicate with the user terminal more conveniently.

Figure 9:
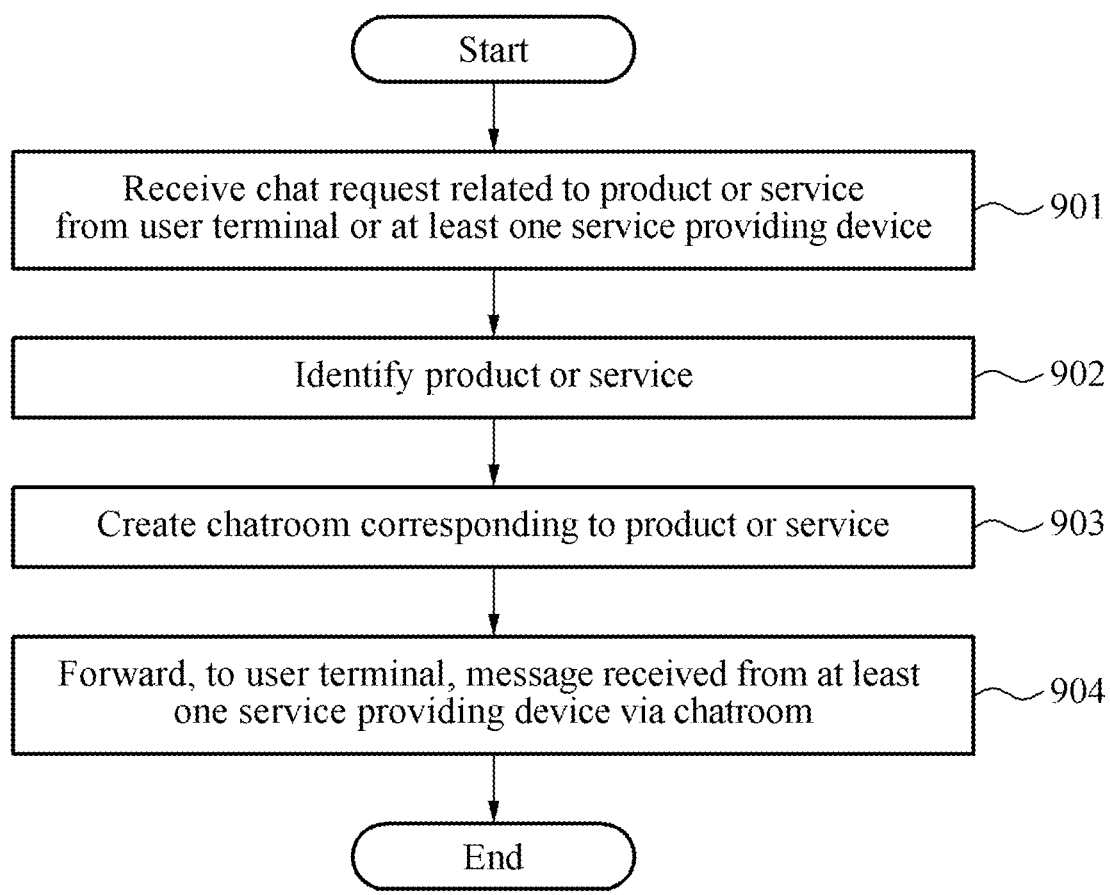
FIG. 9 is a flowchart illustrating a message intermediation method performed by a message intermediation server according to an embodiment.

FIG. 9 is a flowchart illustrating a message intermediation method performed by a message intermediation server according to an embodiment.

In operation 901, a message intermediation server may receive a chat request related to a product or service from a user terminal or at least one service providing device. The message intermediation server may receive the chat request including identification information related to the product or service and a user ID.

In operation 902, the message intermediation server may identify the product or service. The identified product or service may be provided to the user terminal. The product or service may be identified by a unique code, a product name, a service name, or a category.

In operation 903, the message intermediation server may create a chatroom corresponding to the identified product or service. In a case in which a plurality of products or services are unassociated with each other, the message intermediation server may create a separate chatroom for each of the plurality of products or services. In a case in which a plurality of products or services are associated with each other, the message intermediation server may create the chatroom to exchange messages related to the plurality of associated products or services.

The message intermediation server may generate a token based on the identification information related to the product or service and the user ID included in the chat request. The generated token may be provided to the user terminal or the service providing device. The user terminal or the service providing device may access the created chatroom corresponding to the product or service using the token. The token may be a one-time token which is an authority to access the chatroom.

The identification information related to the product or service may refer to unique information to identify the product or service. The user ID may refer to unique information to identify a user of the user terminal, for example, a name or a phone number. The service providing device and the user terminal may access the chatroom corresponding to the product or service using the token.

In operation 904, the message intermediation server may forward, to the user terminal, a message received from the at least one service providing device via the chatroom. When the product or service is provided, the message intermediation server may delete the chatroom corresponding to the product or service. In this example, the message intermediation server may store messages transmitted via the chatroom for a preset period at a request of the user terminal.

Figure 10:
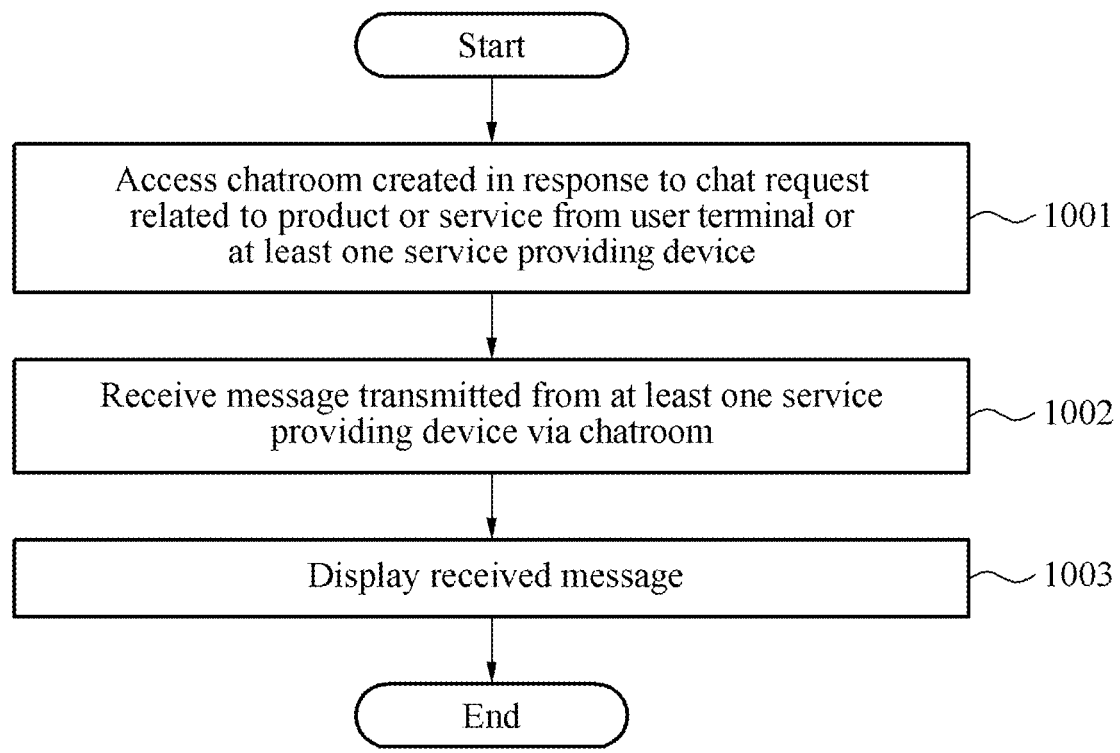
FIG. 10 is a flowchart illustrating a message processing method performed by a user terminal according to an embodiment.

FIG. 10 is a flowchart illustrating a message processing method performed by a user terminal according to an embodiment.

In operation 1001, a user terminal may access a chatroom created in response to a chat request related to a product or service from the user terminal or at least one service providing device.

The chatroom may be created in response to the chat request including identification information related to the product or service and a user ID. A token with respect to the chatroom may be generated based on the identification information related to the product or service and the user ID, and the generated token may be transferred to the user terminal. The user terminal may access the chatroom using the token.

In a case in which a plurality of products or services are unassociated with each other, a separate chatroom may be created for each of the plurality of products or services. In a case in which a plurality of products or services are associated with each other, a message intermediation server may create the chatroom to exchange messages related to the plurality of associated products or services.

In operation 1002, the user terminal may receive a message transmitted from the at least one service providing device via the chatroom. The message transmitted from the service providing device may include a message to inform a user of the user terminal of a schedule related to provision of the product or service, a message to inform the user of product or service preparation, or a message to inform the user of a post-processing process of the product or service. In detail, the message may include content to provide the user terminal with a progress related to provision of the product or service for each process of processing the product or service.

In operation 1003, the user terminal may display the received message via the chatroom.

When the product or service is provided, the chatroom corresponding to the product or service may be deleted. In this example, the message intermediation server may store messages transmitted via the chatroom for a preset period at a request of the user terminal.

Figure 11:
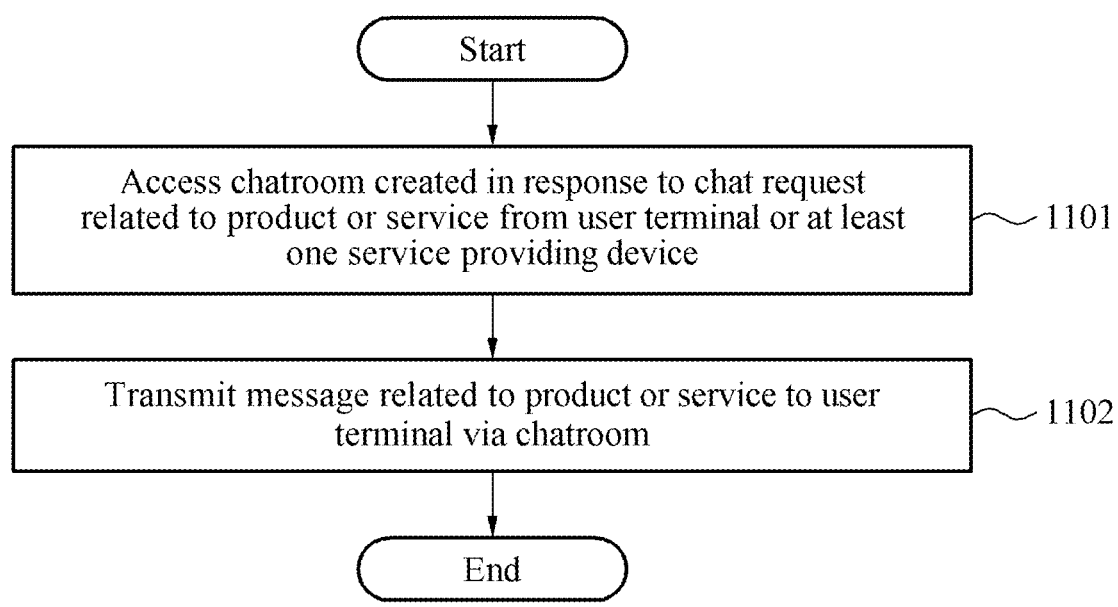
FIG. 11 is a flowchart illustrating a message processing method performed by a service providing device according to an embodiment.

FIG. 11 is a flowchart illustrating a message processing method performed by a service providing device according to an embodiment.

In operation 1101, a service providing device may access a chatroom created in response to a chat request related to a product or service from a user terminal or the service providing device.

The chatroom may be created in response to the chat request including identification information related to the product or service and a user ID. A token with respect to the chatroom may be generated based on the identification information related to the product or service and the user ID, and the generated token may be transferred to the service providing device. The service providing device may access the chatroom using the token. The token may be a one-time token to be used to access the chatroom.

The identification information related to the product or service may refer to unique information to identify the product or service. The user ID may refer to unique information to identify a user of the user terminal, for example, a name or a phone number. The service providing device may access the chatroom corresponding to the product or service for the user terminal using the token.

In operation 1102, the service providing device may transmit a message related to the product or service via the chatroom.

Meanwhile, the service providing device may transmit a message related to a service progress to the user terminal, and control the service progress based on a response of the user terminal with respect to the message related to the service progress.

When the product or service is provided, the chatroom corresponding to the product or service may be deleted. In this example, a message intermediation server may store messages transmitted via the chatroom for a preset period at a request of the user terminal.

Figure 12:
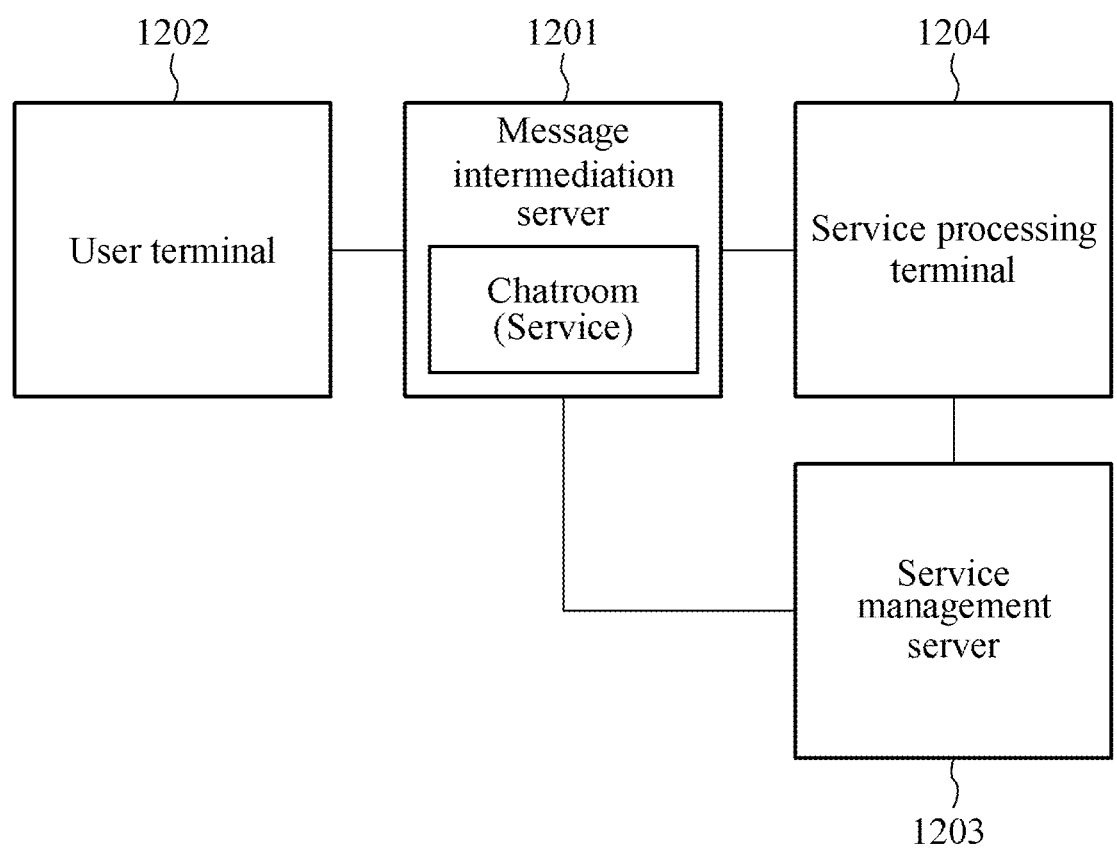
FIG. 12 is a block diagram illustrating an overall system for performing a service management method according to an embodiment.

FIG. 12 is a block diagram illustrating an overall system for performing a service management method according to an embodiment.

Referring to FIG. 12, a system may include a message intermediation server 1201, a user terminal 1202, a service management server 1203, and a service processing terminal 1204. The service management server 1203 or the message intermediation server 1201 may provide the service processing terminal 1204 with a service list including at least one service requested by a user of the user terminal 1202. The service processing terminal 1204 may manage the service using a different process based on an attribute of the service to be performed. The service list may include details of the user requesting the service or details of the service.

The service processing terminal 1204 may be predetermined to provide a service such as a delivery service or a visiting service to the user terminal 1202. In this example, the service processing terminal 1204 receiving the details of the service requested by the user may transmit a service progress message to the user terminal 1202 via a chatroom created based on the service requested by the user. The service progress message may include a message to inform the user of a service progress or to request a response of a service consumer with respect to the service progress.

The message intermediation server 1201 may create a chatroom for each service selected in the service list. The chatroom created based on the service requested by the user may be a chatroom created for one-time use.

The user terminal 1202 may transmit a response to the service progress message to the service processing terminal 1204 via the chatroom. The service processing terminal 1204 may change a service status based on the response of the user terminal 1202. The service status may include a progress of the service, for example, information on service progress stages such as a service start stage, a service in-progress stage, a service provision stage, and a service evaluation stage, service interim information, for example, time or distance information, or a situation of the service customer when the service is provided, for example, a case in which the service customer is absent in a service provision place or a case in which the service customer is present and available to receive the service in the service provision place.

When a service provider provides a service to a service customer, the service provider may consider the service status displayed in the service processing terminal 1204. In this example, the user terminal 1202 and the service processing terminal 1204 may have a N-to-1 relationship.

In another example, the service processing terminal 1204 may not be predetermined with respect to the service requested by the user. The service management server 1203 may transmit a service list including at least one service requested by the user to the service processing terminal 1204. Here, the service management server 1203 may transmit, to the service processing terminal 1204, details of user or details of service of at least one user terminal 1202 included in the service list in conjunction with or separate from the service list based on service setting conditions of the user terminal 1202, for example, a service type, a service schedule, service region information, or type or service schedule information of a service provider. The details of service may include a variety of information to identify a service and confirm content of the service, for example, a product associated with the service, a service provision place, a service request time, or a service provision time. The details of user may include a variety of information to identify a user, for example, a name, a phone number, an ID, an e-mail address, and a nickname.

For example, the service management server 1203 may transmit the service list or details of the service requested by the user only to a service processing terminal 1204 located within a preset radius from a service region set by the user terminal 1202 based on radius information and the set service region.

In another example, the service management server 1203 may transmit the service list or the details of the service requested by the user only to a service processing terminal 1204 of a predetermined service provider set by the user terminal 1202 based on information about a type of the service provider service provider, for example, information on a service provider of a predetermined company name.

Selectively, the service processing terminal 1204 may inquire a service provider possessing the service processing terminal 1204 about whether to process the service requested by the user based on details related to the service requested by the user. Without performing a separate inquiry process, the service provider possessing the service processing terminal 1204 may select a user terminal 1202 to which the service processing terminal 1204 is able to provide a service efficiently, from user terminals 1202 in the service list based on the details of service.

Further, the service processing terminal 1204 may inquire at least one user terminal about whether to consent to the service processing terminal 1204 processing a service requested by the user in the service list.

In a case in which the service provider of the service processing terminal 1204 is determined to process the service requested by the user, for example, in a case in which the user consents to service processing, the service processing terminal 1204 may transmit a service progress message via a chatroom created based on the service requested by the user. The message intermediation server 1201 may create a chatroom for each service. The chatroom created based on the service requested by the user may be a chatroom created for one-time use. In this example, the user terminal 1202 and the service processing terminal 1204 may have a 1-to-1 relationship.

The service processing terminal 1204 may change the service status based on a response of the user terminal 1202. The service status may include a progress of the service, for example, information on service progress stages such as a service start stage, a service in-progress stage, a service provision stage, and a service evaluation stage, service interim information, for example, time or distance information, or a situation of the service customer when the service is provided, for example, a case in which the service customer is absent in a service provision place or a case in which the service customer is present and available to receive the service in the service provision place.

A service management method will be described further hereinafter.

Figure 13:
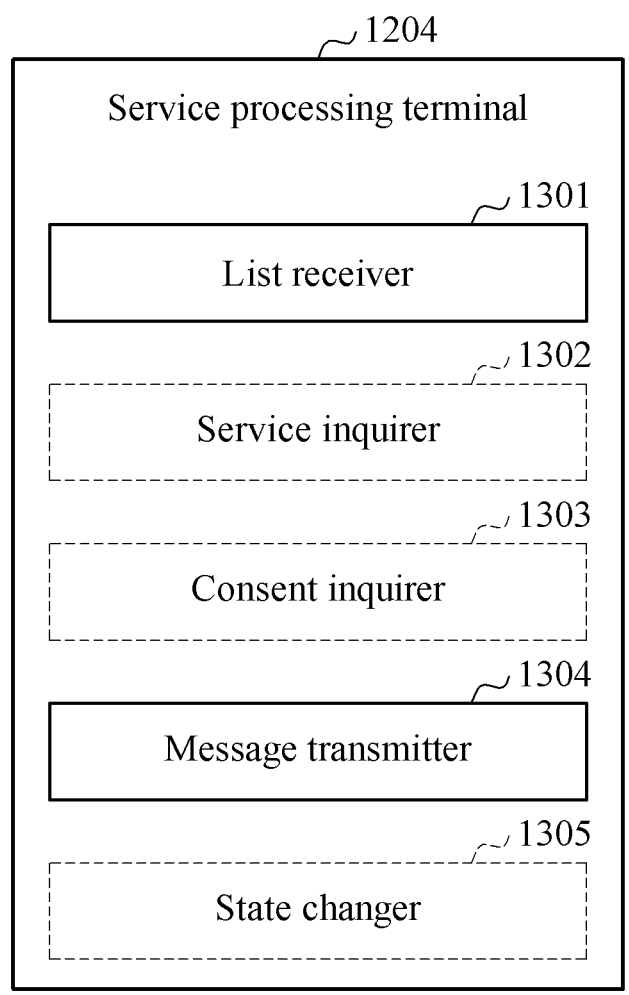
FIG. 13 is a block diagram illustrating a configuration of a service processing terminal according to an embodiment.

FIG. 13 is a block diagram illustrating a configuration of a service processing terminal according to an embodiment.

Referring to FIG. 13, the service processing terminal 1204 may include a list receiver 1301 and a message transmitter 1304. The service processing terminal 1204 may further include a service inquirer 1302. The service processing terminal 1204 may further include a consent inquirer 1303. The service processing terminal 1204 may further include a status changer 1305.

The list receiver 1301 may receive a service list including at least one service requested by a user. The service list may include details of the user or details of the at least one service requested by the user. For example, the list receiver 1301 may arrange the service list based on at least one of a service processing schedule, a service processing region, or a service status related to a user terminal requesting the service.

The service inquirer 1302 may inquire a service provider possessing the service processing terminal about whether to process the service requested by the user based on the details of the service. Without performing a separate inquiry process, the service provider possessing the service processing terminal may select a user terminal to which the service processing terminal is able to provide a service efficiently, from user terminals in the service list based on the details of service.

The consent inquirer 1303 may inquire at least one user terminal included in the service list about whether to consent to processing of the service requested by the user.

When a consent of the user is received from the user terminal in response to the inquiry about whether to consent processing of the service requested by the user, the message intermediation server 1201 may create a chatroom at a request of the user terminal 1202, the service management server 1203, or the service processing terminal 1204. The chatroom may be created for each service. The chatroom may be created based on the service requested by the user, without performing a separate process of registering a friend on a messenger program. The user terminal 1202 and the service processing terminal 1204 may access the chatroom through the messenger program provided by the message intermediation server 1201.

The chatroom may be created for one-time use based on the service requested by the user. The chatroom may disappear when a service processing period preset for the selected service elapses or the service is processed. The chatroom may be created based on details of the user and details of the service requested by the user.

The message transmitter 1304 may transmit a service progress message via the chatroom created based on the service requested by the user. For example, the message transmitter 1304 may transmit the service progress message to a user terminal of another user who is registered as a friend of the user or a user terminal of another user designated by the user.

The status changer 1305 may change the service status based on an input of the service provider possessing the service processing terminal 1204 or a response of the user with respect to the service progress message. The message transmitter 1304 may transmit the new service status to the user terminal 1202.

Figure 14:
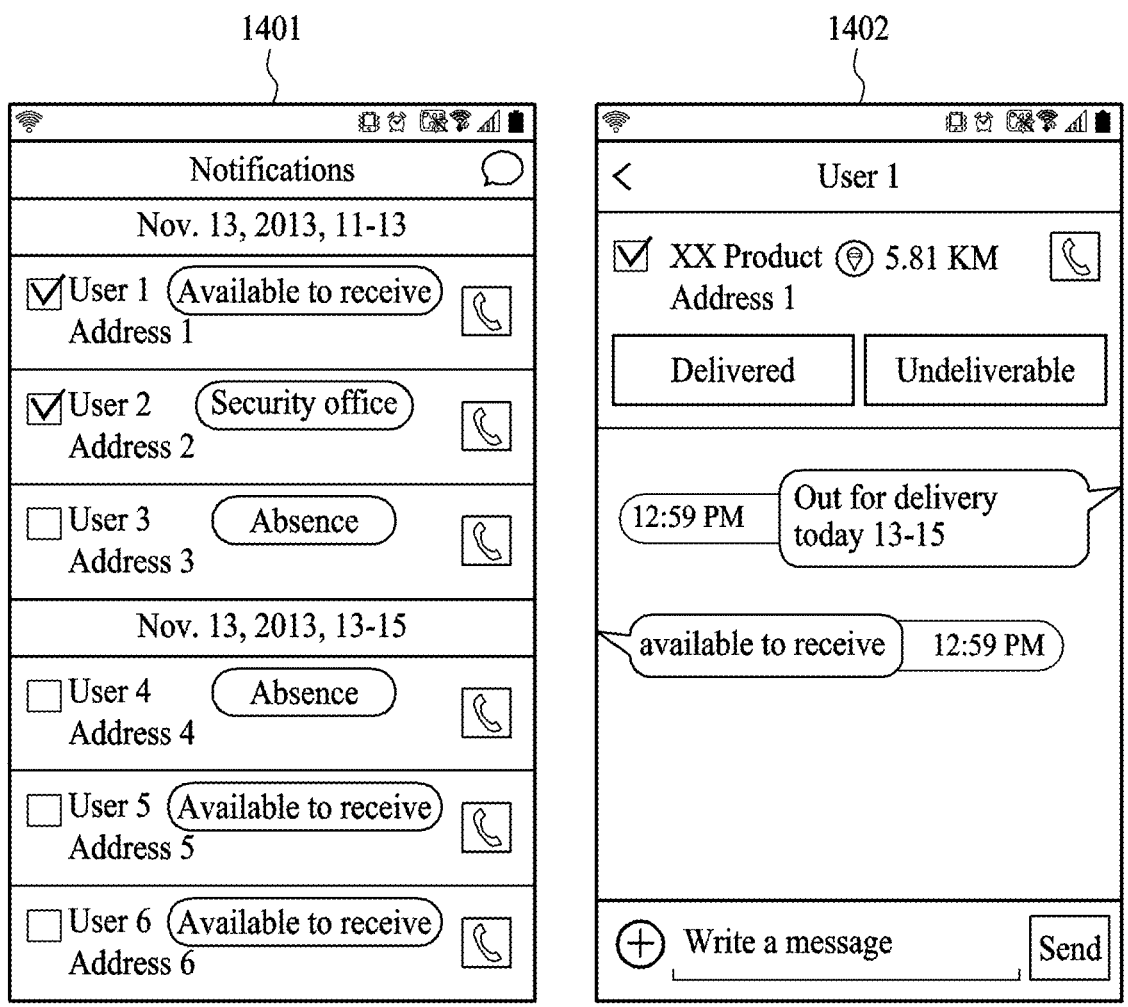
FIG. 14 illustrates a service progress message transmitted from a service processing terminal via a chatroom created based on a service according to an embodiment.

FIG. 14 illustrates a service progress message transmitted from a service processing terminal via a chatroom created based on a service according to an embodiment.

Referring to FIG. 14, the service processing terminal 1204 may transmit a service progress message to a user terminal requesting a service via a chatroom. The service processing terminal 1204 may control a service status based on a response of a user with respect to the service progress message.

For example, a screenshot 1401 of FIG. 14 shows a service list displayed on the service processing terminal 1204, and the service list may include users requesting product delivery services. A plurality of services of the same type may be classified based on users. Further, a plurality of services requested by the same user may be classified based on details of the services. The service list received by the service processing terminal 1204 may include at least one service classified based on the details of the services or the users.

The service processing terminal 1204 may select a user terminal in the service list including the user terminals requesting the product delivery services, and transmit a service progress message to the user terminal 1202 via a chatroom. The service progress message may include a service processing schedule, for example, a scheduled delivery time of the product, as shown in the chatroom of a screenshot 1402.

In the screenshot 1401, the users in the service list may be arranged based on at least one of service statuses, service processing regions, or service processing schedules indicating details of the services. Here, a service processing schedule may refer to a service scheduled time. A service processing region may refer to a distance between a location of a service processing terminal and a service location requested by a user. A service status may refer to a situation of a service customer when a service is provided, and may bet set based on a response of the user with respect to the service processing schedule.

Referring to FIG. 14, the service progress message including the service processing schedule may be transmitted via the chatroom, as shown in the screenshot 1402. Referring to the screenshot 1401, when the service processing terminal 1204 selects a user 1, the service processing terminal 1204 may transmit a service progress message including a service processing schedule to a user terminal 1202 of the user 1, and request a response to the service progress message.

The user terminal 1202 may transmit, to the service processing terminal 1204, a response such as, for example, (i) "available to receive" in a case in which the user may receive a service immediately when a service provider provides the service to the user, (ii) "security office etc." in a case in which the user desires to change a place/schedule to provide a requested service, or (iii) "absence" in a case in which the user may be unavailable to receive a service immediately when a service provider provides the service to the user with respect to the service progress message including the service processing schedule. The service processing terminal 1204 may change the service status to "available to receive", "security office", or "absence" as shown in the screenshot 1401 based on the response of the user terminal 1202. The service provider possessing the service processing terminal 1204 may provide the service requested by the user in view of the new service status.

Figure 15:
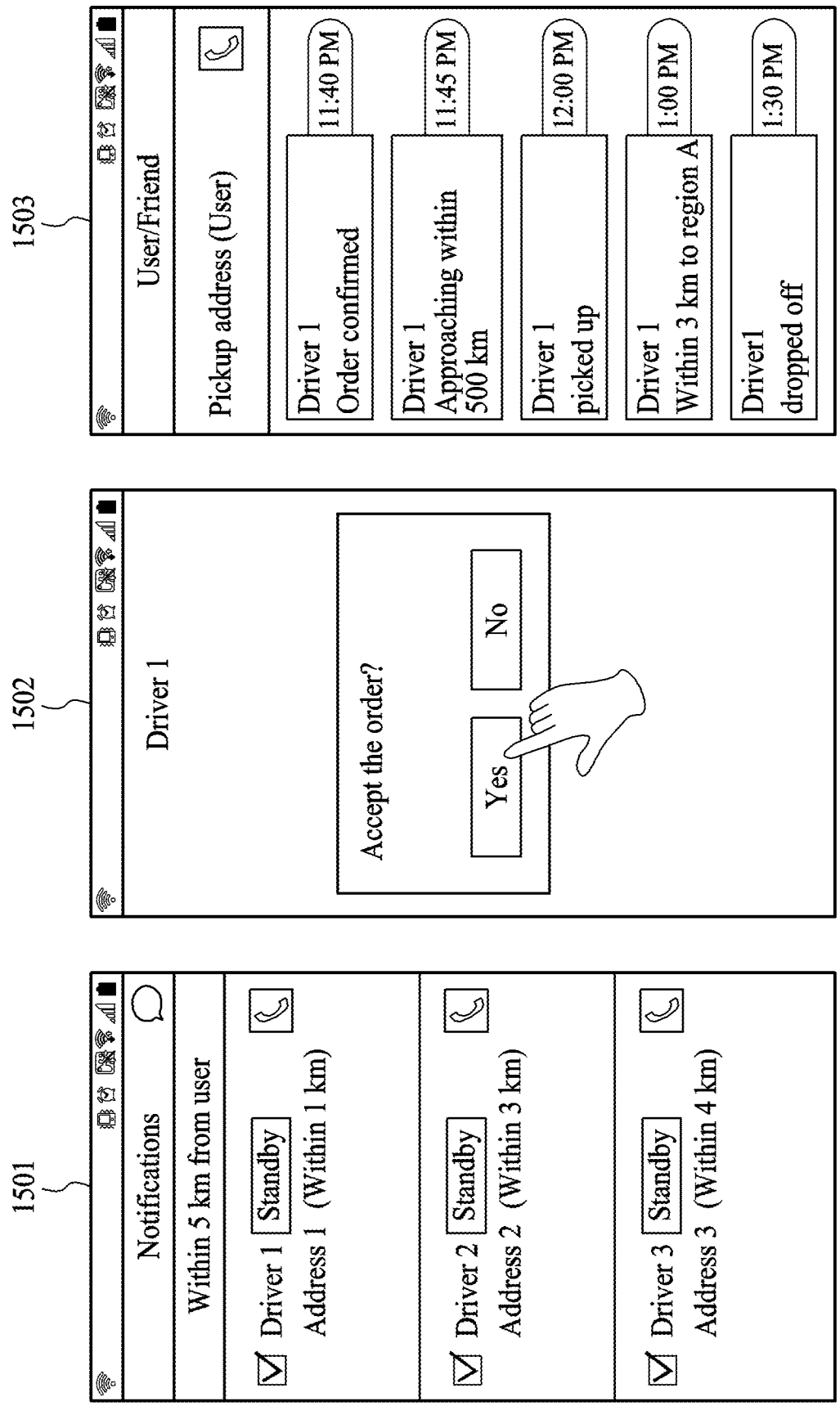
FIG. 15 illustrates a process of inquiring a service processing terminal about whether to process a service according to an embodiment.

FIG. 15 illustrates a process of inquiring a service processing terminal about whether to process a service according to an embodiment.

Referring to FIG. 15, a screenshot 1501 shows a service provider list including at least one service provider each possessing a service processing terminal 1204 and capable of processing a service for a user requesting the service. In this example, FIG. 15 illustrates an example of a taxi service. However, embodiments are not limited thereto.

The service provider list may include details of the service requested by the user. The service provider list may be displayed on the service processing terminal 1204 in conjunction with whether the service provider is processing the service requested by the user or the service provider is on standby, a providing place, for example, an address or a location, of the service requested by the user, or a distance between the user requesting the service and the service provider. The service provider list may be generated when the service management server 1203 or the service processing terminal 1204 receives a request for the service from the user terminal 1202.

The screenshot 1501 may show a case in which a driver 1 who is a service provider possessing the service processing terminal 1204 is inquired about whether to process the service requested by the user.

In a case in which the driver 1 responds that the driver 1 is unable to process the service requested by the user or in a case in which the driver 1 does not respond during a predetermined period of time, a service processing terminal of a driver 2 may inquire the driver 2 about whether to process the service.

An order of inquiring about the service processing may be determined based on a service processing schedule, a service processing region, and a service status. In the example of FIG. 15, the order of inquiring about the service processing may be determined based on distances between the user terminal 1202 and service processing terminals 1204 possessed by respective taxi drivers.

Without performing a separate inquiry process, the driver 1 who is the service provider possessing the service processing terminal 1204 may select a user terminal 1202 to which the driver 1 may provide a service efficiently, from user terminals in a service list, in view of details of service.

In a case in which the service processing terminal of the driver 1 determines to process the service requested by the user, the service processing terminal 1204 may transmit a service progress message via a chatroom created based on the service requested by the user, as shown in a screenshot 1503. The chatroom created based on the service requested by the user may be a chatroom created for one-time use. The service progress message may be a message to inform the user of a progress of the service or a message to request a response of a service customer with respect to the service progress. For example, the service progress message may include messages transmitted before the user boards a taxi, or messages transmitted after the user boards the taxi.

Meanwhile, the service progress message may also be transmitted to a user terminal of another user who is registered as a friend of the user or a user terminal of another user designated by the user, in addition to the user terminal of the user requesting the service.

Figure 16:
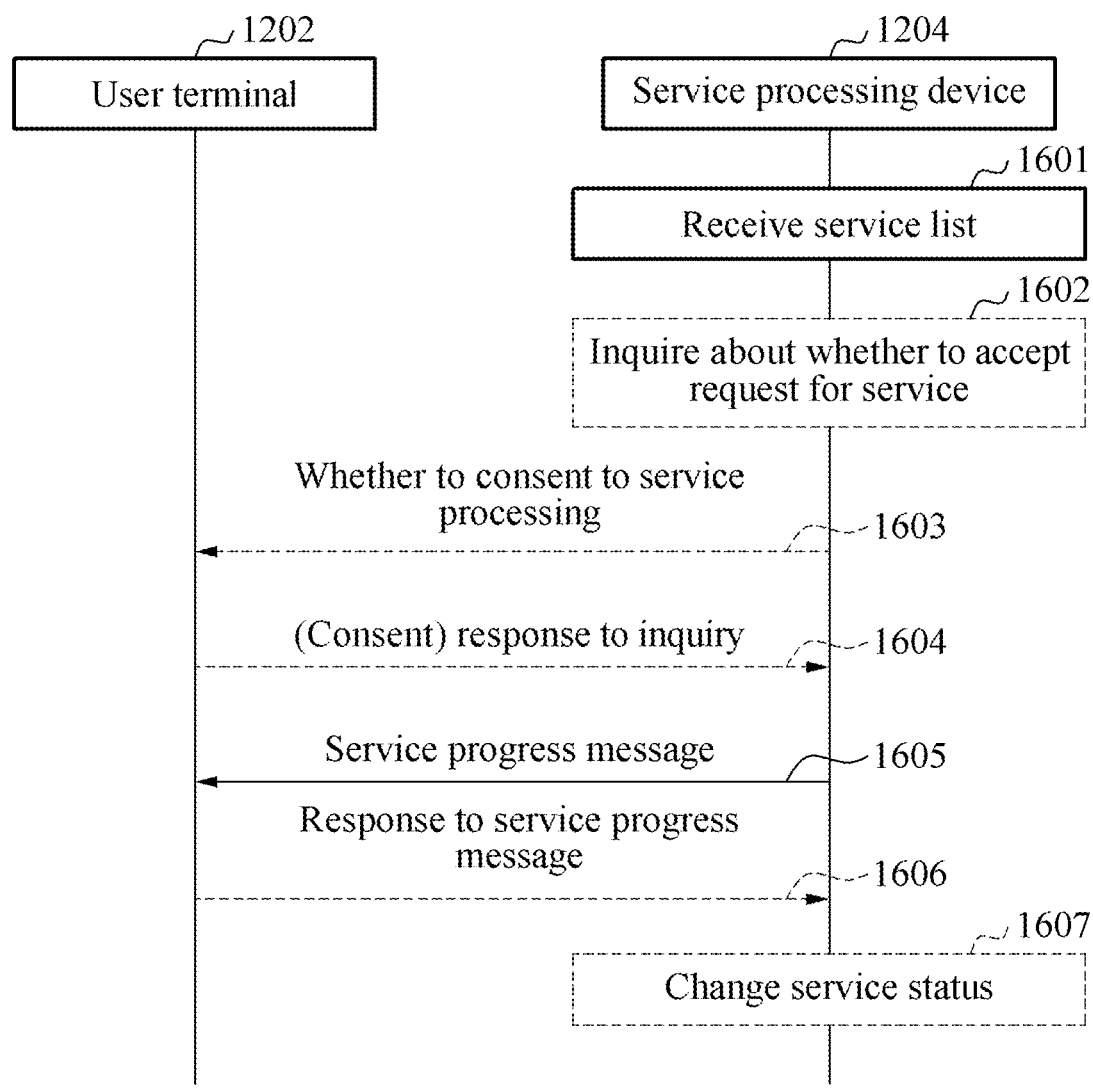
FIG. 16 illustrates a service management method performed by a service processing terminal according another embodiment.

FIG. 16 illustrates a service management method performed by a service processing terminal according to another embodiment.

In operation 1601, the service processing terminal 1204 may receive a service list including at least one user terminal 1202 requesting a service. The service list may include details of a user requesting the service or details of the service. For example, the service processing terminal 1204 may arrange the service list based on at least one of a service processing schedule, a service processing region, or a service status indicating the details of the service requested by the user.

In operation 1602, the service processing terminal 1204 may inquire a service provider possessing the service processing terminal about whether to process the service requested by the user based on the details of the service. Operation 1602 may be performed selectively by the service processing terminal 1204. In another example, without performing a separate inquiry process, the service provider possessing the service processing terminal 1204 may select a user terminal 1202 to which the service processing terminal 1204 is able to provide a service efficiently, from user terminals 1202 in the service list, in view of the details of the service.

In operation 1603, the service processing terminal 1204 may inquire the at least one user terminal 1202 in the service list about whether to consent to processing of the service requested by the user. In operation 1604, the user terminal 1202 may transmit, to the service processing terminal 1204, a response to consent to processing of the service requested by the user. Operations 1603 and 1604 may be performed selectively by the service processing terminal 1204.

Meanwhile, the message intermediation server 1201 may create a chatroom at a request of the user terminal 1202, the service management server 1203, or the service processing terminal 1204. The chatroom may be created for each service. The chatroom may be created based on the service requested by the user, without performing a separate process of registering a friend on a messenger program. The user terminal 1202 and the service processing terminal 1204 may access the chatroom through the messenger program provided by the message intermediation server 1201.

The chatroom may be created for one-time use based on the service requested by the user. The chatroom may disappear when a service processing period preset for the selected service elapses or the service is processed. The chatroom may be created based on details of the user and details of the service requested by the user.

In operation 1605, the service processing terminal 1204 may transmit a service progress message via the chatroom created based on the service requested by the user. For example, the service processing terminal 1204 may transmit the service progress message to a user terminal of another user who is registered as a friend of the user, or a user terminal of another user designated by the user.

In operation 1606, the service processing terminal 1204 may receive a response to the service progress message from the user terminal 1202. Operation 1606 may be performed selectively by the service processing terminal 1204.

In operation 1607, the service processing terminal 1204 may change a service status based on an input of a service provider possessing the service processing terminal 1204 or the response of the user terminal 1202 with respect to the service progress message. The message transmitter 1304 may transmit the new service status to the user terminal 1202. Operation 1607 may be performed selectively by the service processing terminal 1204.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claim.

What is claimed is:

1. A method of messaging service comprising:
   receiving, by at least one server, a chat request for creating a chatroom directed to a transaction that a user has entered into with a first entity, wherein the chat request is received from the first entity different from the user and comprises a transaction identification for identifying the transaction between the user and the first entity and further comprises a user identification for identifying the user;
   in response to receipt of the chat request, creating, by the at least one server, a first chatroom based on the transaction identification, wherein the first chatroom is accessible by the user on a messaging application installed on a user computing device associated with the user;
   in response to creating the first chatroom, generating, by the at least one server, a token usable by the user computing device and a first service providing device of the first entity to access the first chatroom, wherein the token is generated based at least in part on one or both of the transaction identification and the user identification;
   transmitting, by the at least one server, the token to the user computing device associated with the user and the first service providing device of the first entity;
   receiving, by the at least one server, a first message containing information about the transaction from the first entity;
   causing, by the at least one server, the first message to be forwarded to the first chatroom such that the first message is viewable by the user by launching the messaging application installed on the user computing device and selecting the first chatroom from a plurality of chatrooms displayed via the messaging application installed on the user computing device;
   causing the token previously transmitted to the user computing device and the first service providing device of the first entity to be sent to a second service providing device of a second entity that is other than the first entity and is to provide a follow-on service related to the transaction between the user and the first entity;
   receiving, by the at least one server, a second message containing information about the follow-on service from the second entity that has access to the first chatroom with the token; and
   upon receipt of the second message from the second entity, causing, by the at least one server, the second message to be forwarded to the first chatroom such that both of the first message from the first entity and the second message from the second entity are viewable by the user on the messaging application installed on the user computing device via a same chatroom, of the plurality of chatrooms displayed via the messaging application installed on the user computing device, that was previously used to deliver the first message from the first entity to the user.

2. The method of claim 1, wherein the transaction involves two or more products comprising a first product and a second product, wherein the first chatroom is directed to the transaction and is used to provide information about the follow-on service with regard to the first product and the second product.

3. The method of claim 1, wherein the transaction involves two or more products comprising a first product and a second product, wherein the first chatroom is directed to the first product of the transaction and is used to provide information about the follow-on service with regard to the first product, wherein the method further comprises creating a second chatroom that is directed to the second product of the transaction and is used to provide information about a follow-on service with regard to the second product.

4. The method of claim 1, wherein the transaction involves a purchase of at least one of a product and a service.

5. The method of claim 1, wherein the follow-on service comprises a delivery of a product involved in the transaction.

6. The method of claim 1, wherein the first chatroom is identified by the transaction identification.

7. The method of claim 1, wherein the first chatroom is identified by both the transaction identification and the user identification.

8. The method of claim 1, wherein the transaction involves a purchase of a product, wherein the transaction identification comprises product information that is used to identify the product involved in the transaction.

9. The method of claim 1, wherein the transaction involves a purchase of a service, wherein the transaction identification comprises service information that is used to identify the service involved in the transaction.

10. The method of claim 1, wherein the token is generated based on both the transaction identification and the user identification.

11. The method of claim 1, further comprising, subsequent to causing the second message to be forwarded to the first chatroom, receiving a third message from the first entity and causing the third message to be forwarded to the first chatroom such that all of the first message from the first entity, the second message from the second entity, and the third message from the first entity are viewable by the user on the messaging application installed on the user computing device via the same chatroom, of the plurality of chatrooms displayed via the messaging application installed on the user computing device, that was previously used to deliver to the user the first message from the first entity and the second message from the second entity.

12. The method of claim 1, further comprising, in response to determining that a predetermined action associated with the transaction has been performed, causing, by the at least one server, the first chatroom to be deleted from the plurality of chatrooms displayed via the messaging application installed on the user computing device.

13. The method of claim 1, wherein one or both of the first message and the second message include a user interface element that is configured to, when activated by the user, display additional information to the user via the user computing device.

14. The method of claim 1, wherein the token is a one-time token.

15. The method of claim 1, further comprising, in response to the follow-on service from the second entity being completed, causing, by the at least one server, the first chatroom to be deleted from the plurality of chatrooms displayed via the messaging application installed on the user computing device.

16. The method of claim 1, further comprising, in response to the token expiring, causing, by the at least one server, the first chatroom to be deleted from the plurality of chatrooms displayed via the messaging application installed on the user computing device.

17. The method of claim 1, wherein the first message and the second message are stored by the at least one server for a preset period based on a request received from the user computing device.

18. The method of claim 1, further comprising:
transmitting a service progress message to the user computing device via the first chatroom, wherein the service progress message indicates a service progress status associated with the transaction;
receiving, from the user computing device, a response to the service progress message via the first chatroom; and
updating the service progress status associated with the transaction based on the response to the service progress message.

* * * * *